United States Patent
Lambert

(10) Patent No.: US 11,926,907 B1
(45) Date of Patent: Mar. 12, 2024

(54) NICKEL COBALT PHOSPHIDE-BASED NANOPARTICLES AND METHODS OF MAKING, AND ELECTROCHEMICAL SYSTEMS AND METHODS

(71) Applicant: National Technology & Engineering Solutions of Sandia, LLC, Albuquerque, NM (US)

(72) Inventor: Timothy N. Lambert, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 239 days.

(21) Appl. No.: 15/952,769

(22) Filed: Apr. 13, 2018

Related U.S. Application Data

(60) Provisional application No. 62/485,277, filed on Apr. 13, 2017.

(51) Int. Cl.
| | |
|---|---|
| *C25B 11/069* | (2021.01) |
| *C25B 1/04* | (2021.01) |
| *C25B 9/19* | (2021.01) |
| *C25B 9/40* | (2021.01) |
| *C25B 9/73* | (2021.01) |
| *C25B 11/031* | (2021.01) |

(52) U.S. Cl.
CPC .............. *C25B 11/069* (2021.01); *C25B 1/04* (2013.01); *C25B 9/19* (2021.01); *C25B 9/40* (2021.01); *C25B 9/73* (2021.01); *C25B 11/031* (2021.01)

(58) Field of Classification Search
CPC ............. C25B 1/04–1/12; C25B 11/04; C25B 11/0405; C25B 11/0442; C25B 11/0478; B01J 23/75; B01J 23/755; B01J 27/14; B01J 27/16; B01J 27/185; B01J 27/1853
See application file for complete search history.

(56) References Cited

PUBLICATIONS

Wang et al ("Monodisperse Ternary NiCoP Nanostructures as a Bifunctional Electrocatalyst for Both Hydrogen and Oxygen Evolution Reactions with Excellent Performance", Advanced Materials Interfaces, vol. 3, Issue 4, Dec. 2015, pp. 1500454-1-1500454-5). (Year: 2015).*
Zhou et al ("MOF Template-Directed Fabrication of Hierarchically Structured Electrocatalysts for Efficient Oxygen Evolution Reaction", Advanced Energy Materials, vol. 7, issue 12, Feb. 2017, pp. 1602643-1-1602643-10). (Year: 2017).*
Chang et al ("Surface Oxidized Cobalt-Phosphide Nanorods as an Advanced Oxygen Evolution Catalyst in Alkaline Solution", ACS Catalysis, 5, 2015, pp. 6874-6878) (Year: 2015).*
Li et al ("Mechanistic Insights on Ternary Ni 2-x Co x P for Hydrogen Evolution and Their Hybrids with Graphene as Highly Efficient and Robust Catalysts for Overall Water Splitting", Advanced Functional Materials, 2016, 26, pp. 6785-6796) (Year: 2016).*

(Continued)

*Primary Examiner* — Alexander W Keeling
(74) *Attorney, Agent, or Firm* — Daniel J. Jenkins

(57) ABSTRACT

The present disclosure is directed to cobalt and nickel cobalt phosphide/phosphate electrocatalyst nanoparticles for catalyzing electrochemical reactions, such as water splitting. The nanoparticles are formed into electrodes that have bi-functional oxygen evolution reaction (OER) and hydrogen evolution reaction (HER) capabilities.

6 Claims, 2 Drawing Sheets

(56) References Cited

PUBLICATIONS

Liang et al ("Plasma-Assisted Synthesis of NiCoP for Efficient Overall Water Splitting", Nano Letters, 2016, 16, pp. 7718-7725). (Year: 2016).*

Prabu et al ("Hierarchical nanostructured NiCo2O4 as an efficient bifunctional non-precious metal catalyst for rechargeable zinc-air batteries", Nanoscale, 2014, 6, pp. 3173-3181). (Year: 2014).*

Wei et al ("A hierarchically porous nickel-copper phosphide nanofoam for efficient electrochemical splitting of water", Nanoscale, Jan. 2017, 9, 4401-4408) (Year: 2017).*

Ahn, J. et al., "Bifunctional electrodes for an integrated water-electrolysis and hydrogen-oxygen fuel cell with a solid polymer electrolyte," Journal of Applied Electrochemistry (1992) 22:1167-1174.

Armaroli, N. et al., "The Hydrogen Issue," ChemSusChem (2011) 4:21-36.

Baranton, S. et al., "Nickel cobalt hydroxide nanoflakes as catalysts for the hydrogen evolution reaction," Applied Catalysis B: Environmental (2013) 136-137:1-8.

Bard, A. J. et al., "Artificial Photosynthesis: Solar Splitting of Water to Hydrogen and Oxygen," Acc. Chem. Res. (1995) 28:141-145.

Biesinger, M. C. et al., "Resolving surface chemical states in XPS analysis of first row transition metals, oxides and hydroxides: Cr, Mn, Fe, Co and Ni," Applied Surface Science (2011) 257:2717-2730.

Blanchard, P. E. R. et al., "Effects of metal substitution in transition-metal phosphides ($Ni_{1-x}M'_x)_2P$ (M'=Cr, Fe, Co) studied by X-ray photoelectron and absorption spectroscopy," Journal of Materials Chemistry (2009) 19:6015-6022.

Burns, A. W. et al., "Understanding the relationship between composition and hydrodesulfurization properties for cobalt phosphide catalysts," Applied Catalysis A: General (2008) 343:68-76.

Callejas, J. F. et al., "Nanostructured $Co_2P$ Electrocatalyst for the Hydrogen Evolution Reaction and Direct Comparison with Morphologically Equivalent CoP," Chemistry of Materials (2015) 27:3769-3774.

Cao, S. et al., "Cobalt phosphide as a highly active non-precious metal cocatalyst for photocatalytic hydrogen production under visible light irradiation," Journal of Materials Chemistry A (2015) 3:6096-6101.

Chang, J. et al., "Surface Oxidized Cobalt-Phosphide Nanorods as an Advanced Oxygen Evolution Catalyst in Alkaline Solution," ACS Catalysis (2015) 5:6874-6878.

Chen, W.-F. et al., "Biomass-derived electrocatalytic composites for hydrogen evolution," Energy & Environmental Science (2013) 6:1818-1826.

Cobo, S. et al., "A Janus cobalt-based catalytic material for electro-splitting of water," Nature Materials (2012) 11:802-807.

Cook, T. R. et al., "Solar Energy Supply and Storage for the Legacy and Nonlegacy Worlds," Chem. Rev. (2010) 110:6474-6502.

Deng, J. et al., "Highly active and durable non-precious-metal catalysts encapsulated in carbon nanotubes for hydrogen evolution reaction," Energy & Environmental Science (2014) 7:1919-1923.

Dong, Y. et al., "A facile route to controlled synthesis of $Co_3O_4$ nanoparticles and their environmental catalytic properties," Nanotechnology (2007) 18:435602, 6 pages.

Du, H. et al., "Template-assisted synthesis of CoP nanotubes to efficiently catalyze hydrogen-evolving reaction," Journal of Materials Chemistry A (2014) 2:14812-14816.

Du, S. et al., "$Co_3O_4$ nanocrystal ink printed on carbon fiber paper as a large-area electrode for electrochemical water splitting," Chem. Comm. (2015) 51:8066-8069.

Duan, J. et al., "Porous $C_3N_4$ Nanolayers@N-Graphene Films as Catalyst Electrodes for Highly Efficient Hydrogen Evolution," ACS Nano (2015) 9(1):931-940.

Esswein, A. J. et al., "Size-Dependent Activity of $Co_3O_4$ Nanoparticle Anodes for Alkaline Water Electrolysis," J. Phys. Chem. C. (2009) 113:15068-15072.

Estrany, F. et al., "A multi-step template-assisted approach for the formation of conducting polymer nanotubes onto conducting polymer films," Polymer Chemistry (2016) 7:3540-3550.

Fei, H. et al., "Cobalt Nanoparticles Embedded in Nitrogen-Doped Carbon for the Hydrogen Evolution Reaction," Applied Materials & Interfaces (2015) 7:8083-8087.

Feng, L.-L. et al., "High-Index Faceted $Ni_3S_2$ Nanosheet Arrays as Highly Active and Ultrastable Electrocatalysts for Water Splitting," J. Am. Chem. Soc. (2015) 137:14023-14026.

Greeley, J. et al., "Computational high-throughput screening of electrocatalytic materials for hydrogen evolution," Nature Materials (2006) 5:909-913.

Grosvenor, A. P. et al., "Examination of the Bonding in Binary Transition-Metal Monophosphides Mp (M=Cr, Mn, Fe, Co) by X-Ray Photoelectron Spectroscopy," Inorganic Chemistry (2005) 44:8988-8998.

Gu, S. et al., "Three-dimensional interconnected network of nanoporous CoP nanowires as an efficient hydrogen evolution cathode," Phys. Chem. Chem. Phys. (2014) 16:16909-16913.

Guan, Q. et al., "A novel synthetic approach to synthesizing bulk and supported metal phosphides," Journal of Catalysis (2010) 271:413-415.

Hamann, T., "Perovskites take lead in solar hydrogen race," Science (2014) 345(6204): 1566-1567.

He, C. et al., "Amorphous Nickel-Based Thin Film as a Janus Electrocatalyst for Water Splitting," The Journal of Physical Chemistry C (2014) 118:4578-4584.

Huang, Z. et al., "Cobalt phosphide nanorods as an efficient electrocatalyst for the hydrogen evolution reaction," Nano Energy (2014) 9:373-382.

Jiang, N. et al., "Electrodeposited Cobalt-Phosphorous-Derived Films as Competent Bifunctional Catalysts for Overall Water Splitting," Angew. Chem. Int. Ed. (2015) 54:6251-6254.

Jin. H. et al., "In situ Cobalt-Cobalt Oxide/N-Doped Carbon Hybrids as Superior Bifunctional Electrocatalysts for Hydrogen and Oxygen Evolution," J. Am. Chem. Soc. (2015) 137:2688-2694.

Jung, S. et al., "Benchmarking nanoparticulate metal oxide electrocatalysts for the alkaline water oxidation reaction," Journal of Materials Chemistry A. (2016) 4:3068-3076.

Keenan, M. R. et al., "Optimal scaling of TOF-SIMS spectrum-images prior to multivariate statistical analysis," Applied Surface Science (2004) 231-232:240-244.

Kong, D. et al., "Synthesis of $MoS_2$ and $MoSe_2$ Films with Vertically Aligned Layers," Nano Letters (2013) 13:1341-1347.

Kotula, P. G. et al., "Automated Analysis of SEM X-Ray Spectral Images: A Powerful New Microanalysis Tool," Microscopy and Microanalysis (2003) 9:1-17.

Lambert, T. N. et al., "Electrodeposited $Ni_xCo_{3-x}O_4$ nanostructured films as bifunctional oxygen electrocatalysts," Chem. Comm. (2015) 51:9511-9514.

Ledendecker, M. et al., "The Synthesis of Nanostructured $Ni_5P_4$ Films and their Use as a Non-Noble Bifunctional Electrocatalyst for Full Water Splitting," Angew. Chem. Int. Ed. (2015) 54:12361-12365.

Lei, H. et al., "Electrochemical, spectroscopic and theoretical studies of a simple bifunctional cobalt corrole catalyst for oxygen evolution and hydrogen production," Phys. Chem. Chem. Phys. (2014) 16:1883-1893.

Li, Y. et al., "$MoS_2$ Nanoparticles Grown on Graphene: An Advanced Catalyst for the Hydrogen Evolution Reaction," J. Am. Chem. Soc. (2011) 133:7296-7299.

Li, Q. et al., "Cobalt phosphide nanoparticles film growth on carbon cloth: A high-performance cathode for electrochemical hydrogen evolution," International Journal of Hydrogen Energy (2014) 39:16806-16811.

Li, M. et al., "Facile synthesis of various highly dispersive CoP nanocrystal embedded carbon matrices as efficient electrocatalysts for the hydrogen evolution reaction," Journal of Materials Chemistry A (2015) 3:4255-4265.

Liang, H. et al., "Hydrothermal Continuous Flow Synthesis and Exfoliation of NiCo Layered Double Hydroxide Nanosheets for Enhanced Oxygen Evolution Catalysis," Nano Letters (2015) 15:1421-1427.

(56) References Cited

PUBLICATIONS

Liao, P. et al., "Water Oxidation on Pure and Doped Hematite (0001) Surfaces: Prediction of Co and Ni as Effective Dopants for Electrocatalysis," J. Am. Chem. Soc. (2012) 134:13296-13309.

Liu, Q. et al., "Carbon Nanotubes Decorated with CoP Nanocrystals: A Highly Active Non-Noble-Metal Nanohybrid Electrocatalyst for Hydrogen Evolution," Angew. Chem. Int. Ed. (2014) 53:6710-6714.

Liu, M. et al., "Cobalt Phosphide Hollow Polyhedron as Efficient Bifunctional Electrocatalysts for the Evolution Reaction of Hydrogen and Oxygen," Applied Materials & Interfaces (2016) 8:2158-2165.

Lu, A. et al., "Magnetic metal phosphide nanorods as effective hydrogen-evolution electrocatalysts," International Journal of Hydrogen Energy (2014) 39:18919-18928.

Man, I. C. et al., "Universality in Oxygen Evolution Electrocatalysis on Oxide Surfaces," ChemCatChem (2011) 3:1159-1165.

Masa, J. et al., "$Mn_xO_y$/NC and $Co_xO_y$/NC Nanoparticles Embedded in a Nitrogen-Doped Carbon Matrix for High-Performance Bifunctional Oxygen Electrodes," Angew. Chem. Int. Ed. (2014) 53:8508-8512.

McCrory, C. C. L. et al., "Benchmarking Heterogeneous Electrocatalysts for the Oxygen Evolution Reaction," J. Am. Chem. Soc. (2013) 135:16977-16987.

McCrory, C. C. L. et al., "Benchmarking Hydrogen Evolving Reaction and Oxygen Evolving Reaction Electrocatalysts for Solar Water Splitting Devices," J. Am. Chem. Soc. (2015) 137:4347-4357.

McEnaney, J. M. et al., "Amorphous Molybdenum Phosphide Nanoparticles for Electrocatalytic Hydrogen Evolution," Chem. Mater. (2014) 26:4826-4831.

McMurdo, M. J., "The Synthesis of Novel Metal and Metal Oxide Nanoparticles with Applications Towards Catalysis," Dissertation, Doctor of Philosophy, University of California, Berkeley, Spring 2010, 77 pages.

Merki, D. et al., "Amorphous molybdenum sulfide films as catalysts for electrochemical hydrogen production in water," Chemical Science (2011) 2:1262-1267.

Morales-Guio, C. G. et al., "Nanostructured hydrotreating catalysts for electrochemical hydrogen evolution," Chem. Soc. Rev. (2014) 43:6555-6569.

Ouyang, C. et al., "Hierarchically Porous $Ni_3S_2$ Nanorod Array Foam as Highly Efficient Electrocatalyst for Hydrogen Evolution Reaction and Oxygen Evolution Reaction," Electrochimica Acta (2015) 174:297-301.

Pan, Y. et al., "Carbon nanotubes decorated with nickel phosphide nanoparticles as efficient nanohybrid electrocatalysts for the hydrogen evolution reaction," Journal of Materials Chemistry A (2015) 3:13087-13094.

Pan, Y. et al., "Cobalt phosphide-based electrocatalysts: synthesis and phase catalytic activity comparison for hydrogen evolution," Journal of Materials Chemistry A (2016) 4:4745-4754.

Perera, S. D. et al., "Manganese oxide nanorod-graphene/vanadium oxide nanowire-graphene binder-free paper electrodes for metal oxide hybrid supercapacitors," Nano Energy (2013) 2:966-975.

Popczun, E. J. et al., "Nanostructured Nickel Phosphide as an Electrocatalyst for the Hydrogen Evolution Reaction," J. Am. Chem. Soc. (2013) 135:9267-9270.

Popczun, E. J. et al., "Highly Active Electrocatalysis of the Hydrogen Evolution Reaction by Cobalt Phosphide Nanoparticles," Angew. Chem. Int. Ed. (2014) 53:5427-5430.

Pu, Z. et al., "CoP Nanosheet Arrays Supported on a Ti Plate: An Efficient Cathode for Electrochemical Hydrogen Evolution," Chemistry of Materials (2014) 26:4326-4329.

Pu, Z. et al., "Ferric phosphide nanoparticles film supported on titanium plate: A high-performance hydrogen evolution cathode in both acidic and neutral solutions," International Journal of Hydrogen Energy (2015) 40:5092-5098.

Rossmeisl, J. et al., "Electrolysis of water on (oxidized) metal surfaces," Chemical Physics (2005) 319:178-184.

Rossmeisl, J. et al., "Electrolysis of water on oxide surfaces," Journal of Electroanalytical Chemistry (2007) 607:83-89.

Saadi, F. H. et al., "CoP as an Acid-Stable Active Electrocatalyst for the Hydrogen-Evolution Reaction: Electrochemical Synthesis, Interfacial Characterization and Performance Evaluation," The Journal of Physical Chemistry C (2014) 118:29294-29300.

Song, F. et al., "Exfoliation of layered double hydroxides for enhanced oxygen evolution catalysis," Nature Communications (2014) 5:4477, 28 pages.

Stern, L.-A. et al., "$Ni_2P$ as a Janus catalyst for water splitting: the oxygen evolution activity of $Ni_2P$ nanoparticles," Energy & Environmental Science (2015) 8:2347-2351.

Surendranath, Y. et al., "Mechanistic Studies of the Oxygen Evolution Reaction by a Cobalt-Phosphate Catalyst at Neutral pH," J. Am. Chem. Soc. (2010) 132:16501-16509.

Tang, C. et al., "NiSe Nanowire Film Supported on Nickel Foam: An Efficient and Stable 3D Bifunctional Electrode for Full Water Splitting," Angew. Chem. Int. Ed. (2015) 54:9351-9355.

Tavakkoli, M. et al., "Single-Shell Carbon-Encapsulated Iron Nanoparticles: Synthesis and High Electrocatalytic Activity for Hydrogen Evolution Reaction," Angew. Chem. Int. Ed. (2015) 54:4535-4538.

Tian, J. et al., "Self-Supported Nanoporous Cobalt Phosphide Nanowire Arrays: An Efficient 3D Hydrogen-Evolving Cathode over the Wide Range of pH," J. Am. Chem. Soc. (2014) 136:7587-7590.

Tian, J. et al., "Self-Supported $Cu_3P$ Nanowire Arrays as an Integrated High-Performance Three-Dimensional Cathode for Generating Hydrogen from Water," Angew. Chem. Int. Ed. (2014) 53:9577-9581.

Vesborg, P. C. K. et al., "Recent Development in Hydrogen Evolution Reaction Catalysts and Their Practical Implementation," The Journal of Physical Chemistry Letters (2015) 6:951-957.

Mgil, J. A. et al., "Nanostructured cobalt phosphide-based films as bifunctional electrocatalysts for overall water splitting," RSC Advances (2015) 5:105814-105819.

Vrubel, H. et al., "Molybdenum Boride and Carbide Catalyze Hydrogen Evolution in both Acidic and Basic Solutions," Angew. Chem. Int. Ed. (2012) 51:12703-12706.

Walter, M. G. et al., "Solar Water Splitting Cells," Chem. Rev. (2010) 110:6446-6473.

Wang, J. et al., "Cobalt nanoparticles encapsulated in nitrogen-doped carbon as a bifunctional catalyst for water electrolysis," Journal of Materials Chemistry A (2014) 2:20067-20074.

Wang, H. et al., "Bifunctional non-noble metal oxide nanoparticle electrocatalysts through lithium-induced conversion for overall water splitting," Nature Communications (2015) 6:7261, 36 pages.

Xu, Y. et al., "Anion-exchange synthesis of nanoporous FeP nanosheets as electrocatalysts for hydrogen evolution reaction," Chem. Commun. (2013) 49:6656-6658.

Yan, Y. et al., "Facile synthesis of low crystalline $MoS_2$ nanosheet-coated CNTs for enhanced hydrogen evolution reaction," Nanoscale (2013) 5:7768-7771.

Yan, Y. et al., "Recent Development of Molybdenum Sulfides as Advanced Electrocatalysts for Hydrogen Evolution Reaction," ACS Catalysis (2014) 4:1693-1705.

Yang, Y. et al., "Porous Cobalt-Based Thin Film as a Bifunctional Catalyst for Hydrogen Generation and Oxygen Generation," Advanced Materials (2015) 27:3175-3180.

Yu, X. et al., "Nickel-Based Thin Film on Multiwalled Carbon Nanotubes as an Efficient Bifunctional Electrocatalyst for Water Splitting," Applied Materials & Interfaces (2014) 6:15395-15402.

Zeng, K. et al., "Recent progress in alkaline water electrolysis for hydrogen production and applications," Progress in Energy and Combustion Science (2010) 36:307-326.

Zhang, X.-Y. et al., "Graphene/$TiO_2$ nanocomposites: synthesis, characterization and application in hydrogen evolution from water photocatalytic splitting," Journal of Materials Chemistry (2010) 20:2801-2806.

Zheng, Y. et al., "Hydrogen evolution by a metal-free electrocatalyst," Nature Communications (2014) 5:3783, 30 pages.

(56) References Cited

PUBLICATIONS

Zhu, H. et al., "When Cubic Cobalt Sulfide Meets Layered Molybdenum Disulfide: A Core-Shell System Toward Synergetic Electrocatalytic Water Splitting," Advanced Materials (2015) 27:4752-4759.

* cited by examiner

NICKEL COBALT PHOSPHIDE-BASED NANOPARTICLES AND METHODS OF MAKING, AND ELECTROCHEMICAL SYSTEMS AND METHODS

CROSS-REFERENCE TO RELATED APPLICATIONS

This application claims priority to U.S. Provisional Patent Application No. 62/485,277, entitled "NICKEL COBALT PHOSPHIDE NANOPARTICLES AND METHODS OF MAKING, AND SYSTEMS AND METHODS FOR WATER SPLITTING," filed Apr. 13, 2017, the disclosure of which are incorporated herein in its entirety.

STATEMENT CONCERNING FEDERALLY SPONSORED RESEARCH

The United States Government has rights in this invention pursuant to Contract No. DE-AC04-94AL85000 between the United States Department of Energy and Sandia Corporation, and pursuant to Contract No. DE-NA0003525 between the United State Department of Energy and National Technology and Engineering Solutions of Sandia, LLC, for the operation of the Sandia National Laboratories.

FIELD OF THE INVENTION

The present invention relates to electrocatalytic water splitting, and more particularly to nickel cobalt phosphide/phosphate nanoparticles for water splitting.

BACKGROUND OF THE INVENTION

Hydrogen is an attractive possible fuel replacement for carbon polluting fossil fuels, and a possible energy carrier in electrical grid stabilization devices and systems. However, because molecular hydrogen ($H_2$) is not naturally available, the complications of generation, storage and transportation must be addressed. On Earth, hydrogen (H) mainly occurs in combination with oxygen, i.e. in water. One possible technology option for clean $H_2$ generation is low temperature water electrolysis, with the two half-reactions being the oxygen evolution reaction (OER) and hydrogen evolution reaction (HER). These reactions, particularly the OER, are mechanistically complex and dependent on the surface energy of multiple intermediate species, leading to high overpotentials and low efficiency. More effective catalysts with the ability to catalyze both the OER and HER (i.e. OER/HER bifunctional behavior) could improve current electrolyzers and enable future technologies, such as limited bias photo-electrochemical cells and regenerative fuel cells.

Precious metal-based catalyst materials are ultimately not viable, due to rarity and cost, and typically provide high catalytic activity for the OER or HER, but not both. Density functional theory calculations show precious metals and their oxides are near-optimal surfaces for catalyzing the OER (e.g. Ir, $IrO_2$, $RuO_2$) or the HER (e.g. Pt, Pd), and experiments have confirmed their high activity.

The identification of OER/HER bifunctional electrocatalysts is still very recent, and the majority of reported materials are in fact Ni- or Co-based. Early reports of this bifunctional nature on electrodeposited $CoO_x$ and $NiO_x$ showed that the active HER catalyst could be converted to an OER catalyst by oxidation, and vice versa. More recent efforts have also grown Ni-phosphides and Ni-chalcogenides hydrothermally or electrochemically on a support: $Ni_5P_4$ on Ni, $Ni_3S_2$ on Ni foam and NiSe on Ni foam. $Ni_2P$-based nanoparticles and nanowires have also recently been examined as bifunctional OER/HER electrocatalysts, whereby an oxide surface forms upon exposure to OER conditions. Co-based materials include: a Co corrole molecular complex, a Co sulphide/Mo sulphide composite, Co nanoparticles and oxides on carbon supports and electrodeposited CoP-based thin films.

A recent review on acidic HER electrocatalysts indicates that metal phosphides are, in general, more active than the corresponding sulphides or nitrides. Metal phosphides also have good electrocatalytic stability across a wide pH range. Most relevant to this report, CoP-based materials have recently been shown to have high bifunctional activity toward the OER and HER in alkaline electrolyte. The in-situ decomposition of $NaH_2PO_2$ in the presence of a transition metal ion has been used to synthesize many transition metal phosphides, in both free form and on surfaces. There are some reports of Co phosphide-based materials investigated for bifunctional OER/HER electrocatalysis, with three of them being nano-textured Co phosphide-based thin films, derived from (1) an electrodeposited, then anodized Co film, (2) an electrodeposited Co—P alloy film and (3) a $Co_3O_4$ film, in turn derived from an electrodeposited $Co(OH)_x(NO_3)_y$ film. The most recent report is on larger CoP-based micro-structured particles. Generally, the most active cobalt-based non-precious metal OER/HER bifunctional electrocatalysts are surface-supported films. The surface-supported catalyst approach has advantages, but may be limiting for manufacturing and incorporation into membrane electrode assemblies (MEAs), where spray deposition processes or tape casting methods and roll-to-roll manufacturing are desired.

The in-situ decomposition of $NaH_2PO_2$ in the presence of a transition metal ion has been used to synthesize many transition metal phosphides, in both free form and on surfaces. Co phosphide-based materials have been investigated for bifunctional OER/HER electrocatalysis, with three of them being nano-textured Co phosphide-based thin films, derived from (1) an electrodeposited, then anodized Co film, (2) an electrodeposited Co—P alloy film and (3) a $Co_3O_4$ film, in turn derived from an electrodeposited $Co(OH)_x(NO_3)_y$ film. The most recent report is on larger CoP-based micro-structured particles. Generally, the most active cobalt-based non-precious metal OER/HER bifunctional electrocatalysts are surface-supported films. The surface-supported catalyst approach has advantages, but may be limiting for manufacturing and incorporation into membrane electrode assemblies (MEAs), where spray deposition processes or tape casting methods and roll-to-roll manufacturing are desired.

Thus, there is a desire to design effective, high surface area, high bifunctional activity electrocatalysts based on earth abundant, low-cost materials for overall water splitting and other electrolyzer technologies.

SUMMARY OF THE INVENTION

The disclosure is directed to compositions, systems, and methods that include high surface area, cobalt (Co) phosphide-based nano-particulate materials with high bifunctional activity for electrolysis. The materials may include nickel (Ni) doping. The electrolysis may be a water splitting.

According to an embodiment of the disclosure, an electrode is disclosed that includes agglomerated nanoparticles and a conductor. The nanoparticles consist essentially of a metal, phosphorus and oxygen. The metal is selected from a group of cobalt and a mixture of nickel and cobalt.

According to an embodiment of the disclosure, an electrochemical device is disclosed that includes an electrode that includes agglomerated nanoparticles and a conductor. The nanoparticles include a metal, phosphorus and oxygen. The metal is selected from a group of cobalt and a mixture of nickel and cobalt According to another embodiment of the disclosure, a method is disclosed that includes energizing an electrode in an aqueous electrolyte. The electrode includes agglomerated nanoparticles and a conductor. The nanoparticles include a metal, phosphorus and oxygen. The metal is selected from a group of cobalt and a mixture of nickel and cobalt.

According to another embodiment of the disclosure, a water splitting method is disclosed that includes energizing an electrode in an aqueous electrolyte. The electrode includes agglomerated nanoparticles and a conductor. The nanoparticles include a metal, phosphorus and oxygen. The metal is selected from a group of cobalt and a mixture of nickel and cobalt.

An advantage of the disclosed composition, systems and methods is that they provide an economical electrocatalyst for alkaline water splitting reactions, with activities comparable to more expensive precious metals.

Another advantage is that adding Ni in the range of Co:Ni of 2:1 to 100:1 provides for a resulting $Ni_xCo_yP$ catalysts with higher surface areas and catalytic active site densities.

Another advantage is that Ni in the ratio of Co:Ni of 19:1 provides for a resulting NixCoyP catalysts with higher surface areas and catalytic active site densities Another advantage is that the use of Ni in the range Co:Ni of 2:1 to 100:1 provides for an electrocatalyst material with lower overpotentials for both the OER and HER reactions and provides for a better bifunctional electrocatalyst material in that it can perform both the HER and the OER reaction.

Another advantage is that the use of Ni in the ratio of Co:Ni of 19:1 provides for an electrocatalyst material with lower overpotentials for both the OER and HER reactions and provides for a better bifunctional electrocatalyst material in that it can perform both the HER and the OER reaction.

Another advantage is that the use of Ni in the range of Co:Ni of 2:1 to 100:1 provides for a more active electrocatalyst such that less electrocatalyst material can be used to achieve the same activity as without nickel (CPP).

Another advantage is that the use of Ni in the ratio of Co:Ni of 19:1 provides for a more active electrocatalyst such that less electrocatalyst material can be used to achieve the same activity as without nickel (CPP).

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The figures depict embodiments of the present invention for purposes of illustration only, and are not necessarily drawn to scale. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
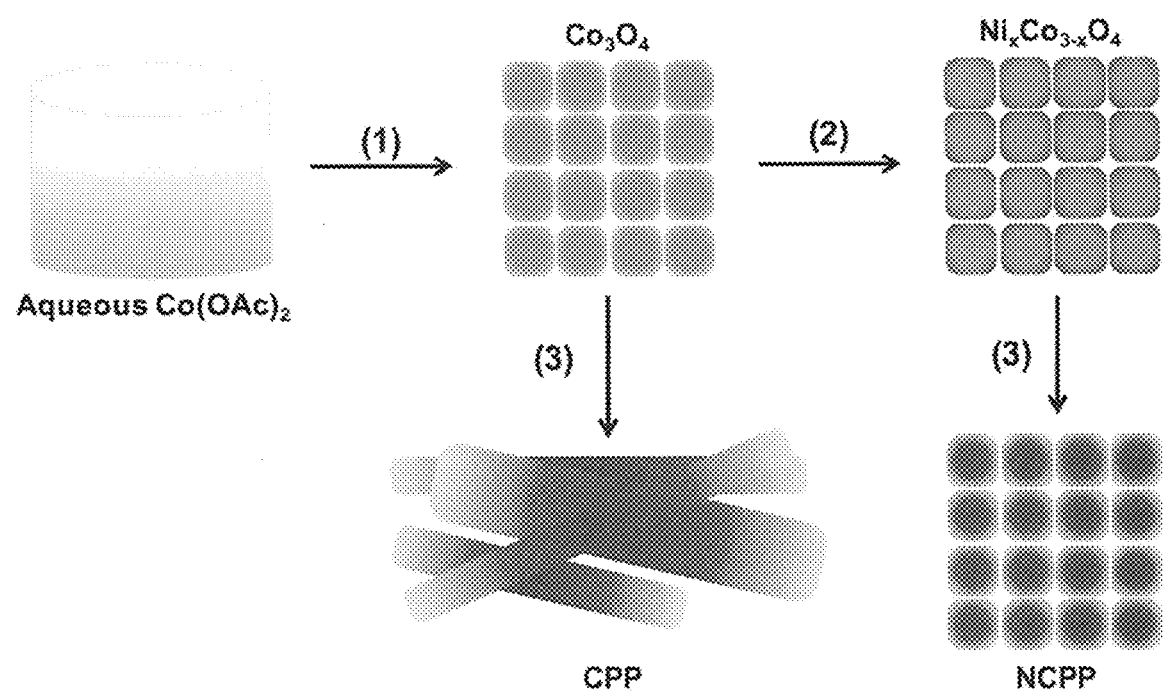
FIG. 1 discloses a synthesis scheme for producing CPP and NCPP nanoparticle electrocatalysts according to an embodiment of the disclosure.

The present disclosure is directed to compositions, methods of making, and systems and method for electrolysis that use high surface area, high bifunctional activity, nanoparticle electrocatalysts based on earth abundant, low-cost materials. The electrolysis may be a water splitting reaction.

As used herein, the term "nanoparticle" includes particles having at least one cross-sectional dimension between 1 and 100 nanometers (nm) in size. In an embodiment, the particles are substantially spherical and have a particle size of between 1 nm and 100 nm. In an embodiment, the particles have a rod geometry and have an axial cross-section of between 1 nm and 100 nm. In an embodiment, the nanoparticles may have a particle size between 5 nm and 25 nm.

The nanoparticle electrocatalysts include cobalt (Co), phosphorus (P) and oxygen (O) in one or more material phases. In an embodiment, the nanoparticle electrocatalysts may include Ni. The material phases may include one or more of phosphide, phosphate and oxygen containing phases. The nanoparticle electrocatalysts as initially synthesized are a Co or NiCo phosphide, however, upon oxidation with air and/or oxidation during an oxygen evolution reaction (OER), or by reaction with electrolyte, oxides and/or attachments to hydroxyl (—OH) groups are formed that introduce or attach oxygen into the nanoparticle electrocatalysts.

The nanoparticle electrocatalysts have a Co to P stoichiometry ratio (all ratios in this disclosure are stoichiometric and will be referred to hereinafter as "ratio") of between 1:1 to 2:1. In an embodiment, the Co to P ratio may be between 0.8:1 and 1.2:1.

The nanoparticle electrocatalysts have a nickel to cobalt range of between >0:1 to 1:1. In an embodiment, the ratio may be between $Ni_{0.05}Co_{2.95}$ and $Ni_1Co_2$. In an embodiment, the composition has a nickel to cobalt range of between $Ni_{0.05}Co_{2.95}$ and $Ni_1Co_2$ in a phosphide particle. In an embodiment, the nanoparticle electrocatalysts may be phosphide nanoparticles. In an embodiment, the nanoparticles may include an oxide phase. In an embodiment, the phosphide particle may have an oxide or hydroxide coating. In another embodiment, the nanoparticles may be oxide particles having phosphide phases having nickel to cobalt stoichiometry ranging from $Ni_{0.05}Co_{2.95}O_4$ to $Ni_1Co_2O_4$ or $Ni_{0.02}Co_{0.98}O$ to $Ni_{0.33}Co_{0.66}O$.

In an embodiment, Ni is added in the range of Co:Ni of 2:1 to 100:1 to provide for a resulting NixCoyP catalysts with higher surface areas and catalytic active site densities. In another embodiment, Ni is added in the ratio of Co:Ni of 19:1 to provide for a resulting NixCoyP catalyst with higher surface areas and catalytic active site densities.

In another embodiment, Ni is added in the range Co:Ni of 2:1 to 100:1 to provide for an electrocatalyst material with lower overpotentials for both the OER and HER reactions and provides for a better bifunctional electrocatalyst material in that it can perform both the HER and the OER reaction. In another embodiment, Ni is added in the ratio of Co:Ni of 19:1 to provide for an electrocatalyst material with lower overpotentials for both the OER and HER reactions and provides for a better bifunctional electrocatalyst material in that it can perform both the HER and the OER reaction.

In another embodiment, Ni is added in the range of Co:Ni of 2:1 to 100:1 to form nickel cobalt phosphide/phosphate nanoparticles (NCPP) that provide for a more active electrocatalyst such that less electrocatalyst material can be used to achieve the same activity as without nickel, cobalt phosphide/phosphate (CPP). In another embodiment, Ni is added in the ratio of Co:Ni of 19:1 provides for a more active electrocatalyst such that less electrocatalyst material can be used to achieve the same activity as without nickel (CPP).

In an embodiment, the CPP and/or NCPP particles are oxidized by exposure to air to form an oxide. In an embodiment, the particle may be or may include an oxide phase containing phosphorus. In an embodiment, the oxide may be formed on the particle outer surface. In an embodiment, the particles may include a hydroxide from exposure to water splitting reaction kinetics.

The present disclosure is further directed to methods for forming cobalt phosphide/phosphate (CPP) particles and cobalt oxide particles. In an embodiment the methods are further directed to forming nickel cobalt phosphide/phosphate (NCPP) particles and nickel cobalt oxide particles. According to an embodiment of the disclosure, a method for forming nickel cobalt phosphide nanoparticles is disclosed that includes providing or preparing precursor $Co_3O_4$ nanoparticles hydrothermally. In an embodiment, the CPP and/or NCPP particles are oxidized by exposure to air to form an oxide. In an embodiment, the particles may include an oxide phase. In an embodiment the oxide may be formed on the particle outer surface by exposure to air. In an embodiment, the particles may include a hydroxide from exposure to water splitting reaction and/or electrolytes.

FIG. 1 discloses a synthesis scheme for producing CPP and NCPP nanoparticle electrocatalysts according to an embodiment of the disclosure. As can be seen in FIG. 1, the CPP nanoparticles have a rod structure, while the NCPP nanoparticles has a round or spherical structure. CPP and NCPP are prepared from cobalt oxide or nickel cobalt oxide, respectively, by a phosphidation reaction with phosphine gas.

Referring to FIG. 1, Step (1) shows the formation of spinel $Co_3O_4$ prepared using an aqueous solvothermal reaction according to an embodiment of the disclosure. In an embodiment cobalt acetate and ammonium hydroxide are mixed together and then heated at 175° C. for 24 h in an autoclave. After reaction the autoclave is cooled and the $Co_3O_4$ is washed with a mixture of water and ethanol and then then dried using a rotary evaporator to isolate the $Co_3O_4$ nanoparticles and then dried in vacuo overnight. Less than 5% CoO phase may be present along with the spinel $Co_3O_4$, although this is not required.

In other embodiments, other cobalt oxide synthesis methods may be used, such as, but not limited to solution precipitation reactions at ambient pressure, mechanochemical, thermal, pyrolysis and sonochemical methods. In other embodiments, the cobalt oxide may be other than spinel.

Referring to FIG. 1, Step (2) shows an ion exchange procedure to partially replace some of the cobalt ions with nickel ions according to an embodiment of the disclosure. In an embodiment, $Ni^{2+}$ incorporation ($Ni_xCo_{3-x}O_4$) (where x is between 0.05 and 1) may be achieved by using an ion exchange process. In an embodiment, x may be between 0.05 and 0.25 Less than 5% CoO phase may be present along with the spinel, although this is not required. Transmission electron microscopy (TEM) images of the precursor $Co_3O_4$ nanoparticles demonstrated roughly spherical or cubic shaped particles with sizes of approximately 20 nm or less. Dispersion of the $Co_3O_4$ nanoparticles in an aqueous $NiCl_2$ solution, followed by a simple workup, provided Ni-doped $Co_3O_4$ with a Co:Ni ratio of 20.5:1 (i.e. $Ni_{0.15}Co_{2.85}O_4$), as determined from acid digestion/inductively coupled plasma-mass spectrometry (ICP-MS) analysis. $Ni_{0.15}Co_{2.85}O_4$ particles were obtained with retention of size, phase and morphology. In an embodiment, nickel cobalt oxide may be prepared directly using the methods outlined above or by including Ni salts along with cobalt salts in the initial synthesis. In other embodiments, other nickel cobalt oxide synthesis methods may be used, such as, but not limited to solution precipitation reactions at ambient pressure, mechanochemical, thermal, pyrolysis and sonochemical methods.

FIG. 1, Step (3) shows the conversion to the CPP or NCPP material: In an embodiment the cobalt oxide or cobalt nickel oxide precursor is heated rapidly in a furnace to 300° C. under flowing argon or nitrogen containing phosphine gas and held at 300° C. for 2 hours. In an embodiment, the phosphine gas may be generated in situ from the thermal decomposition of sodium hypophosphite. In an embodiment the sodium hypophosphite can be added directly to the oxide powder and the mixture is heated. In an embodiment the sodium hypophosphite can be placed upstream in the reaction chamber so that it evolves as a gas and the carrier gas of argon or nitrogen carries it to the oxide material where it reacts to form the CPP or NCPP.

In other embodiments, other CPP and NCPP synthesis methods may be used, such as, but not limited to solution precipitation reactions at ambient pressure, mechanochemical, thermal, pyrolysis and sonochemical methods.

The present disclosure is further directed to an electrode that incorporates the nanoparticle electrocatalysts. In an embodiment, an electrode is disclosed that includes agglomerated nanoparticle electrocatalysts. The electrodes are porous to maximize surface area exposure of the nanoparticle electrocatalysts. The nanoparticle electrocatalysts may be agglomerated by pressing, rolling, pressing and heating, calendaring or other agglomeration methods using the disclosed nanoparticle electrocatalysts. The electrodes include a support current collector, such a conductive mesh, wire or other support structure as known in the art. In an embodiment, the nanoparticles may be agglomerated with or without the use of a binder, such as, but not limited to hydrophobic polymers such as Teflon or may use charged polymers such as anionic (negatively charged) polymers such as Nafion or cationic polymers such as positively charged polyphenylenes, polysulfones, polyacrylamides, polyphenyleneoxides, which may be later removed. In an embodiment, the electrode may include conductive carbon such as graphite, amorphous carbon, carbon nanotubes, graphene, other high surface area carbons or other conductive materials, such as but not limited to metals, that give an overall composite with higher conductivity and lower the overpotential for the electrocatalytic OER and HER reactions.

The choice of binder and carbon can be used to tune the electrode hydrophilicity, that is the electrode can be tuned from one that is hydrophilic in nature to one that is hydrophobic.

Figure 2:
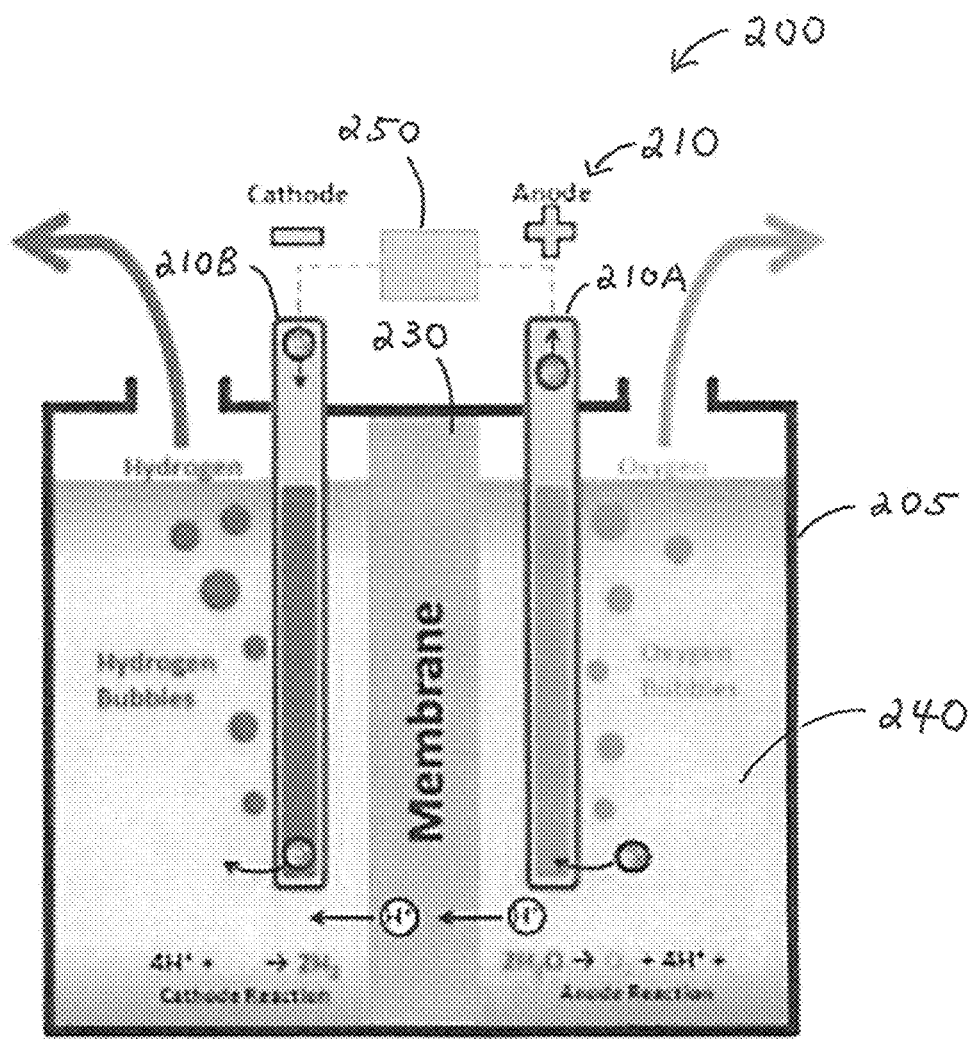
FIG. 2 discloses an electrolyzer according to an embodiment of the disclosure.

The present disclosure is also directed to an electrolyzer including the disclosed agglomerated nanoparticle electrocatalyst electrode. FIG. 2 illustrates an electrochemical cell 200 according to an embodiment of the disclosure. In this exemplary embodiment, the electrochemical cell 200 is an electrolyzer includes a cell housing 205, electrodes 210 including a first or anode electrode 210 and a second or cathode electrode 210B, a separation membrane 230, an electrolyte 240 and a power supply 250. The anode and/or cathode electrodes 210A, 210B, which may be referred to as anode 210A and cathode 210B, respectively may be formed of the nanoparticle electrocatalysts of the present disclosure, formed into an electrode as discussed above. In this exemplary embodiment, the electrolyte 240 is acidic, water based. In other embodiments, the water based electrolyte can either be alkaline or acidic. When alkaline, the electrolyte consists of KOH, NaOH, LiOH or mixtures thereof, where the concentration ranges from 5-30 weight percent. When acidic, the electrolyte consists of $H_2SO_4$, HCl, $HNO_3$, $CH_3CO_2H$, $H_3PO_4$ or other acidifying compound. In an embodiment, the acid concentration ranges from 5-30 weight percent, and the resultant reaction is water splitting for the formation of hydrogen and oxygen gasses. When connected to a power supply 250, a current is passed through the anode and cathode 210A, 210B, and the splitting of water occurs. For water splitting, the HER reaction occurs at the cathode 210B, and the OER reaction occurs at the anode 210A.

The separation membrane 230 is permeable to ions but retards mechanical mixing and diffusion and can be made from asbestos, polymers or ceramics. The use of membranes in electrochemical devices is well understood in the art.

The power supply 250 is selected to drive the electrochemical reaction. The use of power supplies in electrochemical processes is well understood in the art and includes being tied to the electric grid, the use of a battery or the power coming from a renewable energy source such as but not limited to a photovoltaic device.

In the embodiment where an alkaline electrolyte is used the reaction at the cathode 210B the electrocatalyst promotes the combination of water and electrons (e-) to form $H_2$ gas and hydroxide ions according to the equation ($4H_2O+4e^- \rightarrow 2H_2+4OH^-$) while at the anode 210A hydroxide ions are converted to $O_2$ gas and water according to the equation ($4OH^- \rightarrow O_2+2H_2O+4e^-$). The overall cell reaction is $2H_2O \rightarrow 2H_2+O_2$.

In an embodiment where an acidic electrolyte is used the reaction at the cathode 210B the electrocatalyst promotes the combination of protons ($H^+$) and electrons ($e^-$) to form $H_2$ gas according to the equation ($4H^++4e^- \rightarrow 2H_2$) while at the anode 210A water molecules are converted to $O_2$ gas and protons according to the equation ($2H_2O \rightarrow O_2+4H^++4e^-$) the overall cell reaction is $2H_2O \rightarrow 2H_2+O_2$.

In this exemplary embodiment, the electrochemical cell is an electrolyzer. In other embodiments, the disclosed nanoparticle electrocatalysts and electrodes formed therefrom may be used in other electrochemical processes and devices, such as, but not limited to use in photoelectrochemical cells, photoelectrochemical water splitting cells, thermoelectrochemical cells, thermoelectrochemical water splitting cells, metal or ceramic air batteries, lithium or other ion intercalation batteries and sensors. The general performance and structure of these other electrochemical processes and devices are well understood in the art.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A electrode, comprising:
   agglomerated nanoparticles; and
   a conductor;
   wherein the nanoparticles consist essentially of a metal, phosphorus and oxygen; and
   wherein the metal is a mixture of nickel and cobalt having a cobalt to nickel ratio in the range of 2:1 to 100:1; and
   wherein the cobalt to phosphorus ratio is between 0.8:1 and 1.2:1; and
   wherein the nanoparticles have a phosphide core surrounded by an oxide; and
   wherein the nanoparticles also have a phosphate phase.

2. An electrochemical device, comprising:
   an electrode, comprising:
      agglomerated nanoparticles; and
      a conductor;
      wherein the nanoparticles consist essentially of a metal, phosphorus and oxygen; and
   wherein the metal is a mixture of nickel and cobalt having a cobalt to nickel ratio in the range of 2:1 to 100:1; and
      wherein the cobalt to phosphorus ratio is between 0.8:1 and 1.2:1; and
      wherein the nanoparticles have a phosphide core surrounded by an oxide; and
      wherein the nanoparticles also have a phosphate phase.

3. The device of claim 2, further comprising:
   an aqueous electrolyte.

4. A method, comprising:
   energizing an electrode in an aqueous electrolyte;
   wherein the electrode comprises:
      agglomerated nanoparticles; and
      a conductor; wherein the nanoparticles consist essentially of a metal, phosphorus and oxygen; and
   wherein the metal is a mixture of nickel and cobalt
   wherein the metal is a mixture of nickel and cobalt having a cobalt to nickel ratio in the range of 2:1 to 100:1; and
   wherein the cobalt to phosphorus ratio is between 0.8:1 and 1.2:1; and
   wherein the nanoparticles have a phosphide core surrounded by an oxide; and
   wherein the nanoparticles also have a phosphate phase.

5. A water splitting method, comprising:
   energizing an electrode in an aqueous electrolyte;
   wherein the electrode comprises:
      agglomerated nanoparticles; and
      a conductor;
      wherein the nanoparticles consist essentially of a metal, phosphorus and oxygen; and
      wherein the metal is a mixture of nickel and cobalt
      wherein the metal is a mixture of nickel and cobalt having a cobalt to nickel ratio in the range of 2:1 to 100:1; and
      wherein the cobalt to phosphorus ratio is between 0.8:1 and 1.2:1; and
      wherein the nanoparticles have a phosphide core surrounded by an oxide; and
      wherein the nanoparticles also have a phosphate phase.

6. The method of claim 5, further comprising:
   generating hydrogen gas.

* * * * *